US010642333B2

United States Patent
Krishnakumar et al.

(10) Patent No.: US 10,642,333 B2
(45) Date of Patent: May 5, 2020

(54) POWER STORAGE ADAPTER FOR EFFICIENT SUPPLY OF POWER OF MULTIPLE PORTABLE INFORMATION HANDLING SYSTEMS

(71) Applicant: Dell Products L.P., Round Rock, TX (US)

(72) Inventors: Karthikeyan Krishnakumar, Austin, TX (US); Andrew Thomas Sultenfuss, Leander, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 428 days.

(21) Appl. No.: 15/686,056

(22) Filed: Aug. 24, 2017

(65) Prior Publication Data

US 2019/0064914 A1    Feb. 28, 2019

(51) Int. Cl.
| | | |
|---|---|---|
| H02J 7/00 | (2006.01) | |
| G06F 1/3212 | (2019.01) | |
| G06F 1/3234 | (2019.01) | |
| G06F 1/26 | (2006.01) | |
| G06F 1/3287 | (2019.01) | |

(52) U.S. Cl.
CPC ............ *G06F 1/3212* (2013.01); *G06F 1/263* (2013.01); *G06F 1/266* (2013.01); *G06F 1/3234* (2013.01); *G06F 1/3287* (2013.01); *H02J 7/0044* (2013.01); *H02J 7/0063* (2013.01); *H02J 7/0068* (2013.01); *H02J 7/00* (2013.01); *H02J 7/007* (2013.01); *H02J 2007/0067* (2013.01)

(58) Field of Classification Search
USPC ........................................................ 320/107
See application file for complete search history.

(56) References Cited

U.S. PATENT DOCUMENTS

| | | | |
|---|---|---|---|
| 4,672,228 | A | 6/1987 | Swoboda |
| 5,598,327 | A | 1/1997 | Somerville et al. |
| 5,752,046 | A | 5/1998 | Oprescu et al. |
| 5,811,895 | A | 9/1998 | Suzuki et al. |
| 6,057,609 | A | 5/2000 | Nagai et al. |
| 6,293,700 | B1 | 9/2001 | Lund et al. |
| 6,477,054 | B1 | 11/2002 | Hagerup |

(Continued)

FOREIGN PATENT DOCUMENTS

FR    2989323    10/2013

OTHER PUBLICATIONS

Universal Serial Bus, "USB Power Delivery." Retrieved from <http://www.usb.org/developers/powerdelivery/> on Jun. 28, 2017; 3 pages.

(Continued)

*Primary Examiner* — Samuel Berhanu
(74) *Attorney, Agent, or Firm* — Baker Botts L.L.P.

(57) ABSTRACT

A power storage adapter may use a method for efficient supply of power of multiple portable information handling systems. In particular, when electrical power is delivered from a battery to at least one of the portable information handling systems, the power storage adapter may deliver electrical power from the battery to another portable information handling system when the battery has sufficient battery capacity such that the power is supplied efficiently.

20 Claims, 7 Drawing Sheets

(56) References Cited

U.S. PATENT DOCUMENTS

| | | | |
|---|---|---|---|
| 7,127,228 B2 | 10/2006 | Chang et al. | |
| 7,243,246 B2 | 7/2007 | Allen et al. | |
| 7,405,535 B2 | 7/2008 | Frerking et al. | |
| 7,536,569 B2 | 5/2009 | Montero et al. | |
| 7,538,518 B2 | 5/2009 | Wang et al. | |
| 7,545,120 B2 | 6/2009 | Breen et al. | |
| 7,592,716 B2 | 9/2009 | Zhu et al. | |
| 7,646,107 B2 | 1/2010 | Smith | |
| 7,989,981 B2 | 8/2011 | Zhang | |
| 8,164,904 B2 | 4/2012 | Matz et al. | |
| 8,188,594 B2 | 5/2012 | Ganesan et al. | |
| 8,830,073 B2* | 9/2014 | Sims | G06F 1/3203 320/107 |
| 9,166,083 B2 | 10/2015 | Meinel et al. | |
| 9,172,219 B2 | 10/2015 | Mills et al. | |
| 9,197,092 B2 | 11/2015 | Verdun et al. | |
| 9,263,912 B2 | 2/2016 | Verdun et al. | |
| 9,300,015 B2 | 3/2016 | Chang et al. | |
| 9,524,018 B2 | 12/2016 | Sultenfuss et al. | |
| 9,568,990 B2 | 2/2017 | Chueh et al. | |
| 9,681,558 B2 | 6/2017 | Chen et al. | |
| 9,693,446 B2 | 6/2017 | Ragg | |
| 9,780,671 B2* | 10/2017 | Chan | H02M 1/08 |
| 9,805,890 B2* | 10/2017 | Doljack | H02J 7/0036 |
| 9,812,878 B1 | 11/2017 | Stieber et al. | |
| 9,867,275 B2 | 1/2018 | Chen | |
| 9,887,571 B1 | 2/2018 | Thompson et al. | |
| 10,128,764 B1 | 11/2018 | Vinciarelli | |
| 10,181,731 B1 | 1/2019 | Thompson et al. | |
| 10,181,739 B1 | 1/2019 | Thompson et al. | |
| 2003/0085626 A1 | 5/2003 | Odaohhara | |
| 2003/0212923 A1 | 11/2003 | Coppock et al. | |
| 2004/0075418 A1 | 4/2004 | Densham et al. | |
| 2004/0125618 A1 | 7/2004 | Rooij et al. | |
| 2004/0135565 A1 | 7/2004 | Douma et al. | |
| 2005/0052164 A1 | 3/2005 | Sakai et al. | |
| 2005/0125709 A1 | 6/2005 | McKim | |
| 2005/0131645 A1 | 6/2005 | Panopoulos | |
| 2005/0141252 A1 | 6/2005 | Mollo | |
| 2005/0174094 A1 | 8/2005 | Purdy et al. | |
| 2005/0275383 A1 | 12/2005 | Ishishita | |
| 2006/0022637 A1 | 2/2006 | Wang et al. | |
| 2006/0164038 A1 | 7/2006 | Demers et al. | |
| 2006/0214510 A1* | 9/2006 | Patel | H01R 13/6675 307/12 |
| 2007/0079153 A1 | 4/2007 | Bain | |
| 2007/0103110 A1 | 5/2007 | Sagoo | |
| 2007/0200433 A1 | 8/2007 | Kelty | |
| 2007/0248877 A1 | 10/2007 | Qahoug | |
| 2007/0279004 A1 | 12/2007 | Wang et al. | |
| 2008/0222431 A1 | 9/2008 | Paniagua et al. | |
| 2008/0315826 A1 | 12/2008 | Alberth, Jr. et al. | |
| 2009/0001937 A1 | 1/2009 | Densham et al. | |
| 2009/0066294 A1 | 3/2009 | Sabram | |
| 2009/0076661 A1 | 3/2009 | Pearson et al. | |
| 2009/0146826 A1 | 6/2009 | Gofman et al. | |
| 2009/0177906 A1 | 7/2009 | Paniagua, Jr. et al. | |
| 2009/0244944 A1 | 10/2009 | Jang et al. | |
| 2010/0038963 A1 | 2/2010 | Shetty et al. | |
| 2010/0067197 A1 | 3/2010 | Guccione et al. | |
| 2011/0045327 A1 | 2/2011 | Yawata et al. | |
| 2011/0068626 A1* | 3/2011 | Terlizzi | H02J 1/08 307/32 |
| 2011/0140713 A1 | 6/2011 | Snowdon et al. | |
| 2011/0183178 A1 | 7/2011 | Sohn | |
| 2011/0225073 A1 | 9/2011 | Won et al. | |
| 2011/0227407 A1 | 9/2011 | Ransom | |
| 2011/0260681 A1 | 10/2011 | Guccione et al. | |
| 2011/0293984 A1 | 12/2011 | Han et al. | |
| 2012/0025630 A1 | 2/2012 | Tsuda | |
| 2012/0084575 A1 | 4/2012 | Flores et al. | |
| 2012/0091815 A1 | 4/2012 | Richards, III | |
| 2012/0123604 A1 | 5/2012 | Littrell | |
| 2012/0151240 A1 | 6/2012 | Robinson et al. | |
| 2012/0181990 A1 | 7/2012 | Asakura et al. | |
| 2012/0201062 A1 | 8/2012 | Lee | |
| 2012/0256484 A1 | 10/2012 | Kemp | |
| 2012/0316695 A1 | 12/2012 | Chen | |
| 2012/0319656 A1 | 12/2012 | Toma | |
| 2013/0043827 A1 | 2/2013 | Weinstein et al. | |
| 2013/0100568 A1 | 4/2013 | Mistry et al. | |
| 2013/0159792 A1 | 6/2013 | Brooks et al. | |
| 2013/0314039 A1 | 11/2013 | Weber et al. | |
| 2013/0342011 A1 | 12/2013 | Robinson et al. | |
| 2014/0018969 A1 | 1/2014 | Forbes | |
| 2014/0035380 A1 | 2/2014 | Stevens et al. | |
| 2014/0070774 A1 | 3/2014 | Terlizzi et al. | |
| 2014/0157065 A1 | 6/2014 | Ong | |
| 2014/0210267 A1 | 7/2014 | Ishida et al. | |
| 2014/0214223 A1 | 7/2014 | Tsunoda et al. | |
| 2014/0217958 A1 | 8/2014 | Verdun et al. | |
| 2014/0239882 A1 | 8/2014 | Yang | |
| 2015/0037662 A1 | 2/2015 | Pinon et al. | |
| 2015/0063473 A1 | 3/2015 | Nishibayashi | |
| 2015/0132615 A1 | 5/2015 | Yun | |
| 2015/0165917 A1 | 6/2015 | Robers et al. | |
| 2015/0314701 A1 | 11/2015 | Morioka et al. | |
| 2015/0364921 A1 | 12/2015 | Tatsuta et al. | |
| 2016/0099608 A1 | 4/2016 | Jao et al. | |
| 2016/0231777 A1 | 8/2016 | Decamp | |
| 2016/0241148 A1 | 8/2016 | Kizilyalli et al. | |
| 2016/0246316 A1 | 8/2016 | Lim et al. | |
| 2016/0274607 A1 | 9/2016 | Kudo | |
| 2016/0329612 A1 | 11/2016 | Jung | |
| 2016/0359426 A1 | 12/2016 | Jitaru et al. | |
| 2017/0040815 A1 | 2/2017 | Todasco | |
| 2017/0077738 A1 | 3/2017 | Park | |
| 2017/0085098 A1 | 3/2017 | Sporck et al. | |
| 2017/0104330 A1 | 4/2017 | Nakaishi | |
| 2017/0126041 A1 | 5/2017 | Sato | |
| 2017/0177069 A1 | 6/2017 | Bedare et al. | |
| 2017/0225586 A1 | 8/2017 | Zhang et al. | |
| 2017/0293335 A1 | 10/2017 | Dunstan et al. | |
| 2018/0143916 A1 | 5/2018 | Gupta et al. | |
| 2018/0143932 A1 | 5/2018 | Lawless et al. | |
| 2018/0181171 A1 | 6/2018 | Jang et al. | |
| 2018/0233914 A1 | 8/2018 | Miki et al. | |
| 2018/0351399 A1 | 12/2018 | Frey | |
| 2018/0375358 A1 | 12/2018 | Sultenfuss et al. | |
| 2018/0375359 A1 | 12/2018 | Sultenfuss et al. | |
| 2018/0375360 A1 | 12/2018 | Sultenfuss et al. | |
| 2018/0375361 A1 | 12/2018 | Sultenfuss et al. | |
| 2019/0050037 A1 | 2/2019 | Wang et al. | |
| 2019/0065422 A1 | 2/2019 | Sporck et al. | |

OTHER PUBLICATIONS

SMBus, "System Management Bus (SMBus)." Retrieved from <www.smbus.org> on Jun. 28, 2017; 2 pages.

UEFI, "Unified Extensible Firmware Interface (UEFI) Specification", Retrieved from <http://uefi.org> May 2017; 2899 pages.

Wikipedia, "USB." Retrieved from <https://en.wikipedia.org/wiki/USB> on Mar. 19, 2017; 35 pages.

Notice of Allowance and Fee(s) Due for U.S. Appl. No. 15/631,467, filed Jun. 23, 2017, dated Sep. 29, 2017; 13 pages.

Waffenschmidt, Eberhard. "Qi Coupling Factor." Qi Coupling Factor, www.wirelesspowerconsortium.com/technology/coupling-factor.html, Retrieved Jan. 3, 2018; 5 pages.

Waffenschmidt, Eberhard. "Resonant Coupling." Resonant Coupling, https://www.wirelesspowerconsortium.com/technology/resonant-coupling.html; Retrieved Jan. 3, 2018; 4 pages.

Wow! A true free-positioning 5-phone charger—Wireless Power Consortium Blog. Wireless Power Consortium. Web. <http://www.wirelesspowerconsortium.com/blog/67/wow-a-true-free-positioning-5-phone-charger>; Retrieved Jan. 3, 2018; 6 pages.

English machine translation of Souad et al. (FR 2989323) published Oct. 18, 2013.

Received STIC search report from EIC 2800 searcher John DiGeronimo dated Dec. 7, 2017; 31 pages.

(56) References Cited

OTHER PUBLICATIONS

Received STIC search report from EIC 2800 searcher Benjamin Martin dated Sep. 28, 2017; 14 pages.

* cited by examiner

POWER STORAGE ADAPTER FOR EFFICIENT SUPPLY OF POWER OF MULTIPLE PORTABLE INFORMATION HANDLING SYSTEMS

BACKGROUND

Field of the Disclosure

This disclosure relates generally to information handling systems and, more particularly, to a power storage adapter for efficient supply of power of multiple portable information handling systems.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed power storage adapter (PSA) may include a first PSA port and a second PSA port, a PSA battery, and a PSA controller having access to memory media storing instructions executable by the PSA controller. The instructions may establish a first power delivery contract to supply a first electrical power from the PSA to a first portable information handling system coupled to the power storage adapter at the first PSA port. The instructions may also, when an AC line power source does not supply electrical power to the PSA battery, receive a request for a second power delivery contract from a second portable information handling system coupled to the power storage adapter at the second PSA port, the second power delivery contract to supply a second electrical power to the second portable information handling system. The instructions may further, responsive to receiving the request, determine a battery capacity of the PSA battery. The instructions may also, when the battery capacity is sufficient to supply a sum of the first electrical power and the second electrical power for a first minimum duration, perform a first power state analysis further including: determine a first battery threshold power above which the second electrical power supplied at the second PSA port, in addition to the first electrical power supplied at the first PSA port, is supplied with less than a specified power loss, determine a power margin of the PSA as a difference between a maximum power rating of the PSA and the first electrical power, and when the power margin is greater than or equal to the first battery threshold power, establish the second power delivery contract.

In any of the disclosed embodiments of the power storage adapter, the first power state analysis further includes instructions that may determine power delivery states for the second PSA port specifying at most the second electrical power, where a power delivery state specifies a voltage, a power, a power loss, and a temperature rise. The instructions may also determine a start temperature at the PSA and a maximum temperature rise with respect to the start temperature, select a power delivery state for the second PSA port having the temperature rise less than the maximum temperature rise and a lowest power loss, and establish the second power delivery contract for the power delivery state selected.

In any of the disclosed embodiments of the power storage adapter, may further include instructions that may, when the power margin is less than the first battery threshold power discontinue supplying the first electrical power at the first PSA port, responsive to discontinuing supplying the first electrical power, determine a second battery threshold power above which the second electrical power supplied at the second PSA port is supplied with less than the specified power loss, and when the maximum power rating is greater than or equal to the second battery threshold power, establish the second power delivery contract.

In any of the disclosed embodiments of the power storage adapter, may further include instructions that may when the battery capacity is not sufficient to supply the sum of the first electrical power and the second electrical power for the first minimum duration, discontinue supplying the first electrical power at the first PSA port. The instructions may, responsive to discontinuing supplying the first electrical power, when the battery capacity is sufficient to supply the second electrical power for a second minimum duration, perform a second power state analysis further including determine a second battery threshold power above which the second electrical power supplied at the second PSA port is supplied with less than the specified power loss, and when the maximum power rating is greater than or equal to the second battery threshold power, establish the second power delivery contract.

In any of the disclosed embodiments of the power storage adapter, the second power state analysis may further include instructions that may determine power delivery states for the second PSA port specifying at most the second electrical power, where a power delivery state specifies a voltage, a power, a power loss, and a temperature rise, determine a start temperature at the PSA and a maximum temperature rise with respect to the start temperature, select a power delivery state for the second PSA port having the temperature rise less than the maximum temperature rise and a lowest power loss, and establish the second power delivery contract for the power delivery state selected.

In any of the disclosed embodiments of the power storage adapter, further including instructions that may prior to establishing the first power delivery contract, establish a reserved power delivery contract to supply a reserved electrical power from the power storage adapter at the second PSA port. The reserved electrical power may enable the power storage adapter to supply a minimum electrical power at the first PSA port and at the second PSA port, and the minimum electrical power may be selected to enable operation of a PSA port.

In any of the disclosed embodiments of the power storage adapter, the instructions to establish the second power delivery contract may further include instructions that may discontinue supplying the reserved electrical power at the second PSA port.

In any of the disclosed embodiments of the power storage adapter, the first electrical power is supplied at a first DC voltage and the second electrical power is supplied at a second DC voltage.

In any of the disclosed embodiments of the power storage adapter, the specified power loss may result from at least one of: a power loss associated with the first DC voltage, and a power loss associated with the second DC voltage. The first DC voltage and the second DC voltage may be different voltages, and the first PSA port and the second PSA port may be USB Type-C ports.

In any of the disclosed embodiments of the power storage adapter, the first minimum duration and a second minimum duration may be at least 5 watt-hours, a maximum temperature rise may be at most 1.2° F. rise for 15 minutes, and the specified power loss may be based on at least power delivery states for the second PSA port specifying at most the second electrical power. A power delivery state may specifies a voltage, a power, a power loss, and a temperature rise, and the specified power loss and the temperature rise may be based on characterization at the specified voltage and power.

In a further aspect, a disclosed method may include establishing a first power delivery contract to supply a first electrical power from a power storage adapter (PSA) to a first portable information handling system coupled to the power storage adapter at a first PSA port of the PSA. The method may also include, when an AC line power source does not supply electrical power to the PSA battery, receiving a request for a second power delivery contract from a second portable information handling system coupled to the PSA at a second PSA port of the PSA, the second power delivery contract to supply a second electrical power to the second portable information handling system. The method may further include, responsive to receiving the request, determining a battery capacity of the PSA battery. The method may also include, when the battery capacity is sufficient to supply a sum of the first electrical power and the second electrical power for a first minimum duration, performing a first power state analysis further including determining a first battery threshold power above which the second electrical power supplied at the second PSA port, in addition to the first electrical power supplied at the first PSA port, is supplied with less than a specified power loss, determining a power margin of the PSA as a difference between a maximum power rating of the PSA and the first electrical power, and when the power margin is greater than or equal to the first battery threshold power, establishing the second power delivery contract.

In any of the disclosed embodiments of the method, the first power state analysis may also include determining power delivery states for the second PSA port specifying at most the second electrical power. A power delivery state may specify a voltage, a power, a power loss, and a temperature rise. The method may also include determining a start temperature at the PSA and a maximum temperature rise with respect to the start temperature, selecting a power delivery state for the second PSA port having the temperature rise less than the maximum temperature rise and a lowest power loss, and establishing the second power delivery contract for the power delivery state selected.

In any of the disclosed embodiments of the method, the method may also include, when the power margin is less than the first battery threshold power, discontinuing supplying the first electrical power at the first PSA port, responsive to discontinuing supplying the first electrical power, determining a second battery threshold power above which the second electrical power supplied at the second PSA port is supplied with less than the specified power loss, and when the maximum power rating is greater than or equal to the second battery threshold power, establishing the second power delivery contract.

In any of the disclosed embodiments of the method, the method may also include, when the battery capacity is not sufficient to supply the sum of the first electrical power and the second electrical power for the first minimum duration, discontinuing supplying the first electrical power at the first PSA port. The method may also include, responsive to discontinuing supplying the first electrical power, when the battery capacity is sufficient to supply the second electrical power for a second minimum duration, performing a second power state analysis further including determining a second battery threshold power above which the second electrical power supplied at the second PSA port is supplied with less than the specified power loss, and when the maximum power rating is greater than or equal to the second battery threshold power, establishing the second power delivery contract.

In any of the disclosed embodiments of the method, the second power state analysis may further include determining power delivery states for the second PSA port specifying at most the second electrical power, where a power delivery state specifies a voltage, a power, a power loss, and a temperature rise, determining a start temperature at the PSA and a maximum temperature rise with respect to the start temperature, selecting a power delivery state for the second PSA port having the temperature rise less than the maximum temperature rise and a lowest power loss, and establishing the second power delivery contract for the power delivery state selected.

In any of the disclosed embodiments of the method, the method may also include, prior to establishing the first power delivery contract, establishing a reserved power delivery contract to supply a reserved electrical power from the power storage adapter at the second PSA port. The reserved electrical power may enable the power storage adapter to supply a minimum electrical power at the first PSA port and at the second PSA port. The minimum electrical power may be selected to enable operation of a PSA port.

In any of the disclosed embodiments of the method, establishing the second power delivery contract may further include discontinuing supplying the reserved electrical power at the second PSA port.

In any of the disclosed embodiments of the method, the first electrical power may be supplied at a first DC voltage and the second electrical power may be supplied at a second DC voltage.

In any of the disclosed embodiments of the method, the specified power loss may result from at least one of: a power loss associated with the first DC voltage, and a power loss associated with the second DC voltage. The first DC voltage and the second DC voltage may be different voltages, and the first PSA port and the second PSA port may be USB Type-C ports.

In any of the disclosed embodiments of the method, the first minimum duration and a second minimum duration may be at least 5 watt-hours, a maximum temperature rise may be at most 1.2° F. rise for 15 minutes, and the specified power loss may be based on at least power delivery states for the second PSA port specifying at most the second electrical power. A power delivery state may specify a voltage, a power, a power loss, and a temperature rise, and the specified power loss and the temperature rise may be based on characterization at the specified voltage and power.

BRIEF DESCRIPTION OF THE DRAWINGS

For a more complete understanding of the present disclosure and its features and advantages, reference is now made to the following description, taken in conjunction with the accompanying drawings, in which.

Figure 1:
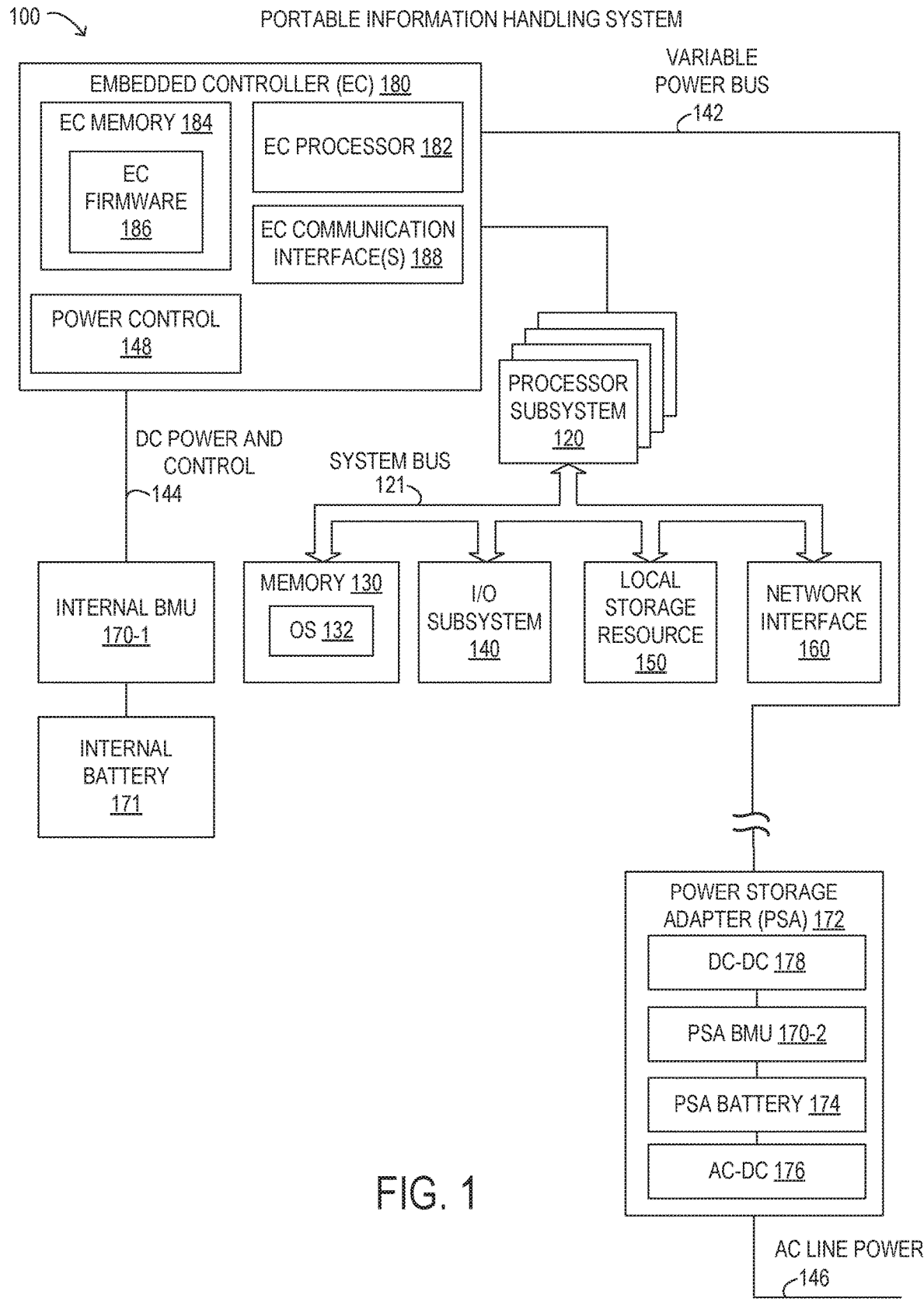
FIG. 1 is a block diagram of selected elements of an embodiment of a portable information handling system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3A, 3B, 4, 5A, and 5B wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170-1 that manages an internal battery 171. Furthermore, information handling system 100 is shown removably coupled to a power storage adapter 172 that incorporates various high efficiency features for use with portable information handling system 100, as disclosed herein. As shown, power storage adapter 172 may be an external device to portable information handling system 100 and may be coupled to portable information handling system 100 using a variable power bus 142, for example, using an appropriate connector, as described in further detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (i SCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170-1. Thus, EC processor 182 may have access to EC memory 184, which may store EC firmware 186, representing instructions executable by EC processor 182.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

Also shown within embedded controller 180 is power control 148, which may be responsible for managing electrical power connections between power storage adapter 172, internal BMU 170-1, and to portable information handling system 100. In some embodiments, power control 148 may be implemented as a separate controller external to embedded controller 180. For example, when variable power bus 142 supplies electrical power to portable information handling system 100, power control 148 may determine whether the electrical power is used to charge internal battery 171 or to directly power portable information handling system 100. Power control 148 may also manage so-called 'soft start up' of portable information handling system 100, such as when portable information handling system 100 awakes from a low power state, such as sleep mode, by determining a source of power during the low power state and managing operation of portable information handling system 100 during the low power state. Power control 148 may accordingly route electrical power and communicate with internal BMU 170-1 via DC power and control 144, which may represent suitable connections between embedded controller 180 and internal BMU 170-1, for example. It is noted that in some embodiments, at least certain portions of power control 148 may be implemented using EC firmware 186, such as specialized executable instructions for power management and control.

In particular embodiments, embedded controller 180 may support a variable power bus 142, which may represent a data bus that also carries and distributes electrical power to and from portable information handling system 100. In various embodiments, variable power bus 142 supports different levels of direct-current (DC) power that may be provided to certain peripherals connected to I/O subsystem 140. In particular embodiments, variable power bus 142 may be used to receive DC power from an external source, such as a power storage adapter 172. For example, the DC power received from the external source may be routed via DC power connection 144 to internal BMU 170-1 for purposes of charging internal battery 171 or otherwise powering portable information handling system 100.

In certain embodiments, variable power bus 142 is implemented according to an industry standard, such as a Universal Serial Bus (USB), which is developed and supported by the USB Implementers Forum, Inc. (USB IF, www.usb.org). In particular, variable power bus 142 may be implemented as a USB Type-C bus that may support different USB devices, such as USB Type-C devices with USB Type-C connectors. Accordingly, variable power bus 142 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B SuperSpeed, Mini-A, Mini-B, Micro-A, Micro-B, Micro-B SuperSpeed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF (http://www.usb.org/developers/powerdelivery/). Examples of source power rules governed by the USB Power Delivery Specification, revision 2.0, version 1.2 are given in Table 1 below.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage

TABLE 1

USB Power Delivery revision 2.0, version 1.2 source power rules.

| Source Output Power [W] | Current [A] at +5 V DC | Current [A] at +9 V DC | Current [A] at +15 V DC | Current [A] at +20 V DC |
|---|---|---|---|---|
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 W to 100 W.

levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When counterparty does not respond within the timeout, a pending request or other communication may fail. It is also noted that in some embodiments, a power delivery contract for zero electrical power may be established, such that no power is transferred but the power port pair remains connected over the USB connection.

As illustrated in FIG. 1, each of portable information handling system 100 and power storage adapter 172 may include a battery management unit (BMU) 170 that controls operation of a respective battery. In particular implementations, BMU 170 may be embedded within a respective battery whose operation BMU 170 controls. For example, internal BMU 170-1 within portable information handling system 100 may control operation of an internal battery 171, while PSA BMU 170-2 within power storage adapter 172 may control operation of a PSA battery 174. More specifically, BMU 170-1 may monitor information associated with, and control charging operations of, internal battery 171, while BMU 170-2 may monitor information associated with, and control charging operations of, PSA battery 174. In operation, each BMU 170 may control operation of a respective battery to enable sustained operation, such as by protecting the battery. Protection of the battery by BMU 170 may comprise preventing the battery from operating outside of safe operating conditions, which may be defined in terms of certain allowable voltage and current ranges over which the battery can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on particular battery chemistry.

In some embodiments, a battery (such as internal battery 171 or PSA battery 174 illustrated in FIG. 1) may be considered to be discharged when an SOC of the battery corresponds to an SOC that is below a predetermined threshold percentage or amount below the 100% charge level given by the TOC voltage, such as below a 5% charge level in one example. A battery may be considered to be charged, i.e., at least partially charged, when the SOC for the battery corresponds to an SOC that is above a first predetermined threshold percentage or amount below the 100% charge level given by the TOC voltage, such as above the 25% charge level in one example. A battery may be considered to be fully charged when the SOC of the battery corresponds to an SOC that is above a second predetermined threshold percentage or amount below the 100% charge level given by the TOC voltage, such as above the 95% charge level for example. A battery may be considered to be at least partially discharged when the SOC of the battery corresponds to an SOC that is below the 100% charge level. The parameters for specifying an SOC described above are examples and may be modified using different values in different embodiments.

In various embodiments, a battery (such as internal battery 171 or PSA battery 174 illustrated in FIG. 1) may include one or more cells having a particular chemistry in a particular cell configuration. For example, in one embodiment, the battery may include four Lithium-ion cells in a two parallel-two serial (2S-2P) configuration. In other embodiments, the battery may include a different number of cells or may include multiple cells in a different configuration. For example, the battery may include three or more cells in various configurations. In some embodiments, the battery may include one or more cells based on any one of a variety of Lithium-ion electro chemistries, or one or more cells based a different electrochemistry than Lithium-ion.

As shown in FIG. 1, power storage adapter 172 may be designed to removably couple to portable information handling system 100 using variable power bus 142. For example, variable power bus 142 may include power connections for electrically coupling power storage adapter 172 to portable information handling system 100 as an external load on power storage adapter 172. Variable power bus 142 may also include a communication link to enable power storage adapter 172 to communicate with portable information handling system 100, such as via embedded controller 180. For example, power storage adapter 172 may communicate battery data collected locally at power storage adapter 172 to portable information handling system 100 over a communication link within variable power bus 142. In other embodiments, there may be a communication link between power storage adapter 172 and portable information handling system 100 that is separate from variable power bus 142 instead of, or in addition to, a communication link that is part of variable power bus 142. In some embodiments, a communication link between power storage adapter 172 and portable information handling system 100, or DC power and control 144, may operate in accordance with a System Management Bus (SMBus) protocol for sending and receiving data. As noted above, in particular embodiments, variable power bus 142 is compatible with USB Type-C and may be implemented according to USB Type-C and USB Power Delivery specifications promulgated by USB IF.

In various embodiments, each of internal battery 171 or PSA battery 174 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. The temperature sensor may be located in proximity to the battery cells to provide an accurate indication of a temperature within the battery. The fuse may be a safety element for limiting current flowing through the main power circuit. The power switch may be an electronically controlled switching element that closes or opens the main power circuit, and thereby allows the battery to operate for charging or discharging.

In FIG. 1, each BMU 170 may include a charging unit (see FIG. 2, charging unit 246) that may control charging cycles for a battery and may apply a TOC voltage as a threshold to determine when charging is complete as the battery voltage increases during charging. The TOC voltage may be lower than or equal to the maximum charge voltage that the battery can physically sustain, in different embodiments. Depending on the actual value for the TOC voltage, a given energy capacity may be stored using the battery. BMU 170 may also be enabled to obtain various types of information associated with a battery and to make decisions according to the obtained information. For example, each BMU 170 may monitor various charging-related parameters or other operating parameters received from one or more batteries, including parameters received from a local battery or parameters received from a remote battery over variable power bus 142.

In some embodiments, parameters monitored by a BMU 170 may include a charging current, a voltage, and a temperature associated with a battery. More specifically, the parameters monitored by the BMU 170 may include any or all of the cell configuration and chemistry of battery cells within the battery, the total voltage of the battery, the voltages of individual battery cells, minimum or maximum cell voltages, the average temperature of the battery as a whole, the temperatures of individual battery cells, the SOC of the battery, the depth of discharge of the battery, the current flowing into the battery, the current flowing out of the battery, and any other measurement of the overall condition of the battery, in various embodiments. In some embodiments, monitoring the SOC may include continuous or periodic monitoring of battery output current, voltage, or both. In some cases, Coulomb counting, in which the charge delivered or stored by a battery is tracked, is used for battery monitoring. In some embodiments, a battery temperature may be monitored through the use of periodic voltage measurements, a thermometer, or any other method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to another device, such as information associated with PSA battery 174 that is provided to or obtained by PSA BMU 170-2 on power storage adapter 172, and which may be provided to portable information handling system 100 over variable power bus 142.

In some embodiments, BMU 170 may calculate additional values, based on the monitored battery parameters or other information obtained from a battery, for example, in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100 or power storage adapter 172, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof. In some embodiments, information indicating an alert condition for PSA battery 174 that is detected by PSA BMU 170-2 on power storage adapter 172 may be provided to portable information handling system 100 over variable power bus 142.

In various embodiments, BMU 170 may further include a DC boost converter (see FIG. 2, DC boost converter 248) that is capable of boosting the voltage provided by the cells within a battery. The DC boost converter may be externally controlled to provide a desired boost voltage output from the battery, such as in response to a control signal or other trigger condition. Because the internal output voltage of the battery may be constrained by the particular battery electrochemistry used to implement the cells, the DC boost converter may enable the battery to output a higher voltage, as desired. In some embodiments, the DC boost converter may be a buck-boost type converter that can step up or step down an input DC voltage.

In some embodiments, embedded controller 180 may implement a voltage control module that senses the current drawn by an electrical load and provides a control signal to BMU 170-1 based on the current drawn by the electrical load. For example, the voltage control module may be implemented as executable code stored by EC memory 184, while the electrical load may be information handling system 100, or portions thereof. It may be advantageous, for example, to provide a higher voltage to the electrical load in order to minimize the power dissipated by losses incurred in transmitting current from internal battery 171 to the electrical load. In another embodiment, the voltage control module may provide control signals in response to a voltage set signal. The voltage set signal may instruct the voltage control module to control BMU 170-1 to produce a particular voltage at the load. For example, the particular voltage level may allow the load to operate in a desired mode of operation. In one embodiment, the particular voltage level indicated by the voltage set signal may be higher than the voltage output by cells within a battery. BMU 170-1 may boost the voltage output by the cells to the voltage indicated by the voltage set signal.

For example, in some embodiments, a battery (such as internal battery 171 or PSA battery 174 illustrated in FIG. 1) may provide electrical power to the information handling system 100 at an output voltage controlled by its respective BMU 170. In some cases, portable information handling system 100 may provide load state information to the voltage control module. In some embodiments, the load state information may be based on the operating mode of the load, or on a desired future operating mode of the load. The voltage control module may determine a voltage level based on the load state information, and may provide voltage control information based on the determined voltage level to internal BMU 170-1 or PSA BMU 170-2. In one embodiment, voltage control information provided to PSA BMU 170-2 may specify the output voltage level of power storage adapter 172. In another embodiment, voltage control information provided to PSA BMU 170-2 may indicate a preferred voltage range for the output voltage level of power storage adapter 172. In yet another embodiment, voltage control information provided to PSA BMU 170-2 may indicate that the output voltage level of power storage adapter 172 should be increased or should be decreased.

In certain embodiments, BMU 170 may include a processor and memory (not shown). The memory may store instructions executable by the processor to perform one or more of the methods described herein for obtaining and calculating values related to the operation and charging of a battery and for controlling the operation and charging of the battery. The memory may also store data, obtained and calculated values, thresholds, and parameters related to the methods described herein.

In FIG. 1, power storage adapter 172 is shown receiving AC line power 146 as an external power source. AC line power 146 may represent a connection to line power, such as using a standard line power cable. In some embodiments, AC line power 146 may be a removable connection, such as a cable that plugs into line power in a wall socket, and plugs into a corresponding receptacle included with power storage adapter 172. Also included within power storage adapter 172 in FIG. 1 is AC-DC converter 176. AC-DC converter 176 may receive alternating current (AC) from AC line power 146 and may output one or more DC voltages for supplying electrical power to other components in power storage adapter 172. For example, an output DC voltage from AC-DC converter 176 may be supplied to PSA battery 174 for charging purposes. An output DC voltage from AC-DC converter 176 may be supplied to a DC-DC converter 178, which may then generate one or more other DC voltages. Also, an output DC voltage from AC-DC converter 176 may be directly supplied to variable power bus 142, such as to fulfill a power contract, as described above. Additional details of power storage adapter 172 are described below with respect to FIGS. 2, 3A, and 3B.

As will be described in further detail herein, in operation, power storage adapter 172 may supply portable information handling system 100-1 with first electrical power at port 230-1, as governed by a first power delivery contract as described above. Power storage adapter 172 may then receive a request for a second power delivery contract to supply a second electrical power to portable information handling system 100-2 at port 230-2. In response to this request, power storage adapter 172 may determine that it is capable of supplying electrical power to both portable information handling systems 100-1 and 100-2. However, under certain conditions, establishing a second power delivery contract may not be desirable to maintain efficient supply of electrical power under battery power. For example, when power storage adapter 172 is not connected to AC line power 146, PSA battery 174 is available as a power source for supplying electrical power to portable information handling systems 100-1 and 100-2. Furthermore, when PSA battery 174 has a relatively low battery capacity, power storage adapter 172 may only be able to supply substantially less electrical power than the second electrical power specified in the second power delivery contract. When power storage adapter 172 supplies a relatively low electrical power, such as less than about 1 watt, the efficiency for supplying the electrical power is substantially reduced, because certain power losses due to inefficiency, such as thermal losses, will comprise a much greater relative portion of the output power supplied to portable information handling system 100-2 by power storage adapter 172.

Therefore, when an AC line power source does not supply electrical power to PSA battery, power storage adapter 172 receives a request for a second power delivery contract to supply a second electrical power to portable information handling system 100-2, and PSA battery 174 has a relatively low battery capacity, power storage adapter 172 may determine status of PSA battery 174 including its battery capacity. When the battery capacity is not sufficient to supply the first electrical power and the second electrical power, power storage adapter 172 may perform a power state analysis. In response to the power state analysis, power storage adapter 172 may deduce a level of electrical power that may be efficiently supplied to portable information handling system 100-2 including any adjustments to the first power delivery contract needed to be able to supply this level of electrical power. Then, power storage adapter 172 may establish the second power delivery contract to supply the resulting level of electrical power. Further details of power storage adapter 172 using a method for efficient supply of power of multiple portable information handling systems are described below.

Figure 2:
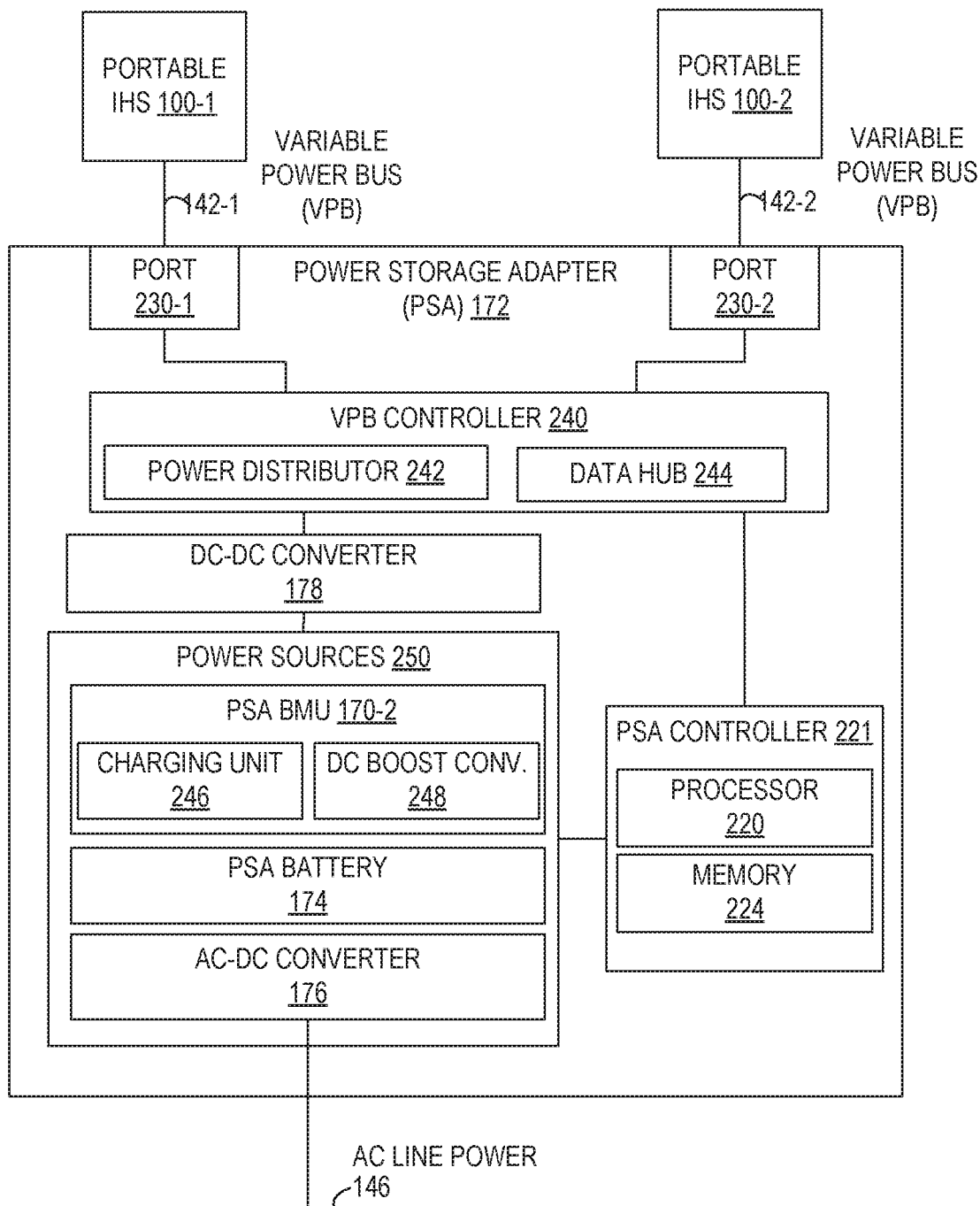
FIG. 2 is a block diagram of selected elements of an embodiment of multiple portable information handling systems with an external power storage adapter.

Referring now to FIG. 2, selected elements of an embodiment of a system 200 with portable information handling systems 100-1 and 100-2 and power storage adapter 172 are shown. FIG. 2 illustrates further internal details of power storage adapter 172. It is noted that FIG. 2 is not drawn to scale but is a schematic illustration. In various embodiments, power storage adapter 172 may be implemented using fewer or additional components than illustrated in FIG. 2.

In FIG. 2, power storage adapter 172 is coupled to portable information handling system 100-1 via variable power bus (VPB) 142-1 and portable information handling system 100-2 via variable power bus (VPB) 142-2, as described above with respect to FIG. 1. Additionally, power storage adapter 172 is also externally connected to AC line power 146, as described above with respect to FIG. 1.

As shown in FIG. 2, power storage adapter 172 includes power sources 250, a DC-DC converter 178, a VPB controller 240, and two ports 230, as well as a PSA controller 221 comprising processor 220 and memory 224. As shown, power sources 250 comprise an AC-DC converter 176, a PSA battery 174, and a PSA BMU 170-2. In FIG. 2, PSA BMU 170-2 is shown including a charging unit 246 and a DC boost converter 248, while VPB controller 240 is shown including a power distributor 242 and a data hub 244. In some embodiments, DC boost converter 248 may include buck-boost DC conversion functionality to step up or step down an input DC voltage. VBP controller 240 is depicted in FIG. 2 in an implementation with two ports 230-1 and 230-2 that support variable power buses 142-1 and 142-2. As noted above, variable power buses 142 may be compatible with USB Type-C specifications promulgated by USB IF. Accordingly, in particular embodiments, each of ports 230 may be a USB Type-C port. In different embodiments, each of ports 230 may also be a USB Type-C port or another type of port, such as a USB Type-A port, among others. Although two ports 230 are shown in the example embodiment of FIG. 2, it will be understood that power storage adapter 172 may include fewer or more ports 230 in different embodiments.

As shown in FIG. 2, power storage adapter 172 includes PSA controller 221, which may perform various actions and functions. In some embodiments, PSA controller 221 is implemented using a custom integrated circuit, or a customizable integrated circuit, such as a field programmable gate array (FPGA). In the embodiment shown in FIG. 2, PSA controller 221 includes processor 220 and memory 224, which may store executable instructions (such as executable code) that may be executed by processor 220, which has access to memory 224. Processor 220 is typically implemented as an integrated circuit, such as a microprocessor or microcontroller, and is enabled to execute instructions that cause power storage adapter 172 to perform the functions and operations described herein. For the purposes of this disclosure, memory 224 may include non-transitory computer-readable media that stores data and instructions for at least a period of time. Memory 224 may comprise persistent and volatile media, fixed and removable media, and magnetic and semiconductor media. Memory 224 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM) or flash memory, non-transitory media, or various combinations of the foregoing. Memory 224 is operable to store instructions, data, or both. Memory 224 may store sets or sequences of instructions that may represent executable computer programs for implementing various functionality provided by power storage adapter 172.

The functionality and implementation details of certain elements in power storage adapter 172, such as AC-DC converter 176, PSA battery 174, PSA BMU 170-2, and DC-DC converter 178, are described above with respect to FIG. 1.

As shown, VPB controller 240 may include power distributor 242, which may represent various electronic components that enable distribution of DC power with respect to variable power buses 142 via ports 230. Specifically, power distributor 242 may receive at least one DC power input from DC-DC converter 178. Power distributor 242 may route or switch power connections to respective ports 230, for example, to enable fulfillment of a power contract, as described above. A power contract established by VPB controller 240, such as according to a USB Power Delivery Specification, may govern the supply of DC power to portable information handling system 100-1 via port 230-1. VPB controller 240 may also establish another power contract to supply DC power to another device coupled to port 230-2, such as portable information handling system 100-2. In some embodiments, VPB controller 240 supplies DC power to both port 230-1 and port 230-2. Power distributor 242 may supply different DC voltages for output power at different ports 230. In particular embodiments, power distributor 242 supplies a different DC voltage to port 230-1 than to port 230-2.

In some embodiments, power distributor 242 may be unable to supply the same DC voltage for output power to both port 230-1 and port 230-2. For example, power storage adapter 172 may be implemented to limit supply of a particular voltage to a single one of ports 230. Furthermore, power storage adapter 172 may be constrained from simultaneously supplying portable information handling systems 100-1 and 100-2 because of the rated electrical power capability of power storage adapter 172. Examples of these limitations are given in Table 2 below for power storage adapter 172 having a maximum power rating of 45 W.

In FIG. 2, data hub 244 may represent electronic functionality to manage various VPB connections over variable power buses 142. Specifically, data hub 244 may control operation of power distributor 242 and may, in turn, be controlled by PSA controller 221, such as by executable code (not shown) stored in memory 224 and executed by processor 220. Additionally, data hub 244 may store state information for each respective port 230, such as USB state information. For example, data hub 244 may store information associated with power contracts that power storage adapter 172 has established or is in the process of negotiating. Accordingly, data hub 244 may store various information about different VPB devices connected to power storage adapter 172 via ports 230. As used herein, the phrase "power consuming device" may refer to any system, apparatus, or device consuming the electrical power provided by a battery. For example, a portable information handling system may consume power for components such as one or more displays, processors, storage media, memory, or other components.

In the illustrated embodiment, charging unit 246 of BMU 170-2 may draw electrical power from AC-DC converter 176, and may, in turn output a charging voltage and charging current suitable to charge the cells of PSA battery 174. The charging voltage and the charging current demands of the battery may be dependent on an electrochemistry or a cell configuration of the battery cells. The charging of the battery may be limited by the current supply capability of the DC source. In some embodiments, the DC source may be AC-DC converter 176. Once the battery reaches 100% state of charge, BMU 170-2 may stop drawing current from the AC-DC converter 176. When a boost source of power is desired, charging unit 246 may also be enabled to supply electrical from PSA battery 174, which is then boosted to a desired output voltage by DC boost converter 248.

In some embodiments, portable information handling system 100 may communicate with power storage adapter 172 to instruct PSA BMU 170-2 to charge the battery cells of PSA battery 174. As previously noted, PSA BMU 170-2 may send information to portable information handling systems 100, such as the cell configuration, the state of charge of the battery, or other information. Portable information handling systems 100 may communicate with PSA BMU 170-2 using a system management bus (not shown), for example System Management Bus (SMBus) promulgated by SBS Implementers Forum (www.smbus.org), in some embodiments.

In operation for efficient supply of power of multiple portable information handling systems, power storage adapter 172 may establish a first power delivery contract to supply a first electrical power, such as 30 W, to portable information handling system 100-1 when connected to port 230-1 via variable power bus 142-1. When an AC line power source does not supply electrical power to PSA battery 174, power storage adapter 172 may receive a request for a second power delivery contract to supply a second electrical power, such as 15 W, to portable information handling system 100-2 when connected to port 230-2 via variable power bus 142-2. Ports 230-1 and 230-2 and variable power busses 142-1 and 142-2 may be compatible with USB Type-C to establish USB power delivery contracts between portable information handling systems 100 and power storage adapter 172. The first and second power delivery contracts may be USB power delivery contracts.

Responsive to receiving the request, power storage adapter 172 may decide when to start supplying the second electrical power from PSA battery 174 to portable information handling system 100-2 such that the second electrical power is supplied efficiently. To decide when to start, power storage adapter 172 may determine battery status of PSA battery 174. Battery status may include a battery capacity, and a power demand. When the battery capacity is sufficient to supply a sum of the first electrical power and the second electrical power for a first minimum duration, power storage adapter 172 may perform a first power state analysis to determine whether the second electrical power may be delivered efficiently. The first minimum duration may be in watt-hours (Wh) of battery capacity remaining. When the remaining battery capacity is less than the first minimum duration, establishing the second power delivery contract may be inefficient. For example, the first minimum duration may be at least 5 Wh of battery capacity remaining. Establishing the second power delivery contract with less than 5 Wh remaining would be inefficient.

In performing the first power state analysis, power storage adapter 172 may determine a first battery threshold power above which the second electrical power supplied at port 230-2, in addition to the first electrical power supplied at port 230-1, is supplied with less than a specified power loss. The specified power loss may include a power loss associated with a voltage regulator to regulate a respective voltage (VR+15V DC 324 of FIG. 3B), a power loss associated with a voltage conversion circuitry for the respective voltage, and know losses of a power delivery path from PSA battery 174 to port 230-2, among other power losses. In various embodiments, the specified power loss may be based on characterization data collected during characterization of supplying electrical power at a respective port 230 at each power and voltage supported at the port 230. For example, the characterization data for supplying 30 W at 20V may result in a power loss of 2.4 W (an 8% power loss) and for supplying 30 W at 15V may result in a power loss of 3 W (a 10% power loss). The specified power losses for 30 W at 20V and 30 W at 15V may be 2.4 W and 3 W respectively. The characterization to collect the characterization data may be performed prior to operation of power storage adapter 172. In other embodiments, the specified power loss may be based on measurement data from measurements of power drawn from PSA battery 172 and power delivered at a port 230. In alternate embodiments, the specified power loss may be based on a combination of characterization data and measurement data.

Power storage adapter 172 may also determine a power margin of power storage adapter 172 as a difference between a maximum power rating of power storage adapter 172 and the first electrical power. The power margin represents the amount of electrical power available to supply to port 230-2. In one or more embodiments, the power margin may a difference between the maximum rated electrical power and the first electrical power and an additional reserved electrical power, described in more detail below.

Power storage adapter 172 may then determine power delivery states for port 230-2 specifying at most the second electrical power, where a power delivery state specifies a voltage regulator, a voltage, a power, a power loss, and a temperature rise. Power storage adapter 172 may also determine the voltage for supplying the first electrical power at port 230-1 from the first power delivery contract and the associated voltage regulator being used. Power storage adapter 172 may further determine whether any of the power delivery states having that voltage are available for supplying the second electrical contract using the voltage regulator in use at port 230-1, described in further detail below with respect to FIG. 3B and Table 3. Examples of power delivery states for a respective port 230 are given in Table 2 below.

| Power State | Voltage Regulator | Voltage | Power | Power Loss | Temperature Rise (F.) |
|---|---|---|---|---|---|
| 1 | VR +5 V DC 320 | 5 V | 0.5 W | 0.04 W | 0.01° F. |
| 2 | VR +5 V DC 320 | 5 V | 2.5 W | 0.1 W | 0.04° F. |
| 3 | VR +5 V DC 320 | 5 V | 15 W | 1.5 W | 0.6° F. |
| 4 | VR +9 V DC 322 | 9 V | 15 W | 1.2 W | 0.8° F. |
| 5 | VR +9 V DC 322 | 9 V | 27 W | 2.7 W | 1.1° F. |
| 6 | VR +15 V DC 324 | 15 V | 27 W | 2.2 W | 0.8° F. |
| 7 | VR +15 V DC 324 | 15 V | 45 W | 4.5 W | 1.1° F. |
| 8 | VR +20 V DC 332 | 20 V | 45 W | 3.6 W | 0.9° F. |

As shown in Table 2, the example power delivery states may be for power storage adapter 172 having a 45 W maximum power delivery capability when AC line power source does not supply electrical power to PSA battery 174. The respective port 230 may have 8 power delivery states at the four USB standardized voltage levels (+5V DC, +9V DC, +15V DC, and +20V DC). As shown in Table 2, the power loss may vary for different voltages. Similar to the specified power loss described above, the power loss and the temperature rise of each power delivery state may be based on characterization data, measurement data, or a combination of characterization data and measurement data of supplying electrical power at a respective port 230 at each power and voltage shown in Table 2. For example, when the second electrical power is 15 W, power storage adapter 172 determines that the power delivery states 1, 2, 3, and 4 specify at most 15 W based on Table 2.

In one or more embodiments, data hub 244 may store the power delivery states for each respective port 230.

In response to determining the power delivery states, power storage adapter 172 may determine a start temperature at power storage adapter 172 and a maximum temperature rise with respect to the start temperature. The start temperature is the present temperature of power storage adapter 172 when the first power contract is in effect and before establishing the second power delivery contract. The maximum temperature rise specifies the maximum amount the start temperature may increase without reaching thermal saturation or trigger a thermal event. For example, the maximum temperature rise may be at most 1.2° F. rise for 15 minutes. When the start temperature rises more than the maximum temperature rise, power storage adapter 172 may need to shutdown to prevent damage to the device.

Power storage adapter 172 may then select a power delivery state for port 230-2 having the temperature rise less than the maximum temperature rise and a lowest power loss.

The selected power delivery state specifies the voltage and power that would be the most efficient for supplying at most the second electrical power at port 230-2. When the power margin is greater than or equal to the first battery threshold power, power storage adapter 172 may establish the second power delivery contract for the power delivery state selected.

When the power margin is less than the first battery threshold power, power storage adapter 172 may discontinue supplying the first electrical power at port 230-1 to cause the power margin to be equal to the maximum power rating. Responsive to discontinuing supplying the first electrical power, power storage adapter 172 may then determine a second battery threshold power above which the second electrical power supplied at port 230-2 is supplied with less than the specified power loss, as described above. When the power margin is greater than or equal to the second battery threshold power, power storage adapter 172 may establish the second power delivery contract for the power state selected.

When the battery capacity is not sufficient to supply the sum of the first electrical power and the second electrical power for the first minimum duration, power storage adapter 172 may discontinue supplying the first electrical power at port 230-1 to cause the battery capacity to be sufficient to supply the second electrical power. Responsive to discontinuing supplying the first electrical power, when the battery capacity is sufficient to supply the second electrical power for a second minimum duration, power storage adapter 172 may perform a second power state analysis similar to the first power state analysis previously described. Power storage adapter 172 may determine a second battery threshold power above which the second electrical power supplied at port 230-2 is supplied with less than the specified power loss. Power storage adapter 172 may also determine power delivery states for port 230-2 specifying at most the second electrical power, which may be different than the power delivery states previously determined because discontinuing supplying the first electrical power may make additional power delivery states available for consideration. Power storage adapter 172 may further select a power delivery state for port 230-2 having the temperature rise less than the maximum temperature rise and a lowest power loss. When the maximum power rating is greater than or equal to the second battery threshold power, power storage adapter 172 may establish the second power delivery contract for the power delivery state selected. In various embodiments, the first electrical power is supplied at a first DC voltage and the second electrical power is supplied at a second DC voltage. In some embodiments, the first DC voltage and the second DC voltage may be different voltages.

When the battery capacity is not sufficient to supply the second electrical power for the second minimum duration and the maximum power rating is less than the second battery threshold power, power storage adapter 172 may establish a third power delivery contract to supply a third electrical power to portable information handling system 100-2 at port 230-2. The third electrical power may be a minimum electrical power, described in more detail below. For example, the third electrical power may be at most 2.5 watts at 500 mA and +5 V DC, which is the lowest USB power operating mode. In one or more embodiments, the third electrical power may be zero watts to avoid the power losses associated with 2.5 W mode when the battery capacity is sufficiently low.

In one or more embodiments, prior to establishing the first power delivery contract to supply the first electrical power to portable information handling system 100-1, power storage adapter 172 may establish a reserved power delivery contract to supply a reserved electrical power from power storage adapter 172 at port 230-2. Establishing the reserved power delivery contract at port 230-2 reserves the reserved electrical power so that it is available to supply a minimum electrical power at both ports 230-1 and 230-2. The minimum electrical power may be selected to enable operation of a port 230. For example, the minimum electrical power may be at most 2.5 watts at 500 mA and +5 V DC, which enables power storage adapter 172 to detect when a device, e.g. a portable information handling system 100, is connected to a port 230 and negotiate a power delivery contract with the connected device. The reserved electrical power may be equal to the minimum electrical power multiplied by a scaler, where the scaler is equal to the number of ports 230 of power storage adapter 172. Thus, power storage adapter 172 has at least a minimum electrical power capability to enable it to negotiate a minimum power delivery contract to supply the minimum electrical power to each portable information handling system 100 connected to each port 230 of the scaler ports 230 of power storage adapter 172. In order to minimize a power loss associated with the minimum power delivery contract established at port 230-2, a skip mode regulator of power storage adapter 172 may be utilized. The skip mode regulator turns 5 volts on, discharges to a very low point, and turns back on again, performing this repetitively. The period the skip mode regulator is not converting energy, the voltage regulation drifts because there is not load at port 230-2. When there is no load connected, operating the regulator in this manner is more efficient. For example, instead of a power loss of 8% to 10%, the power loss may be reduced to 0.5%. Then, prior to establishing the second power delivery contract to deliver the second electrical power to portable information handling system 100-2 at port 230-2, power storage adapter 172 may discontinue supplying the minimum electrical power at port 230-2, where discontinuing supplying the minimum electrical power may be accomplished by terminated the minimum electrical power contract for port 230-2.

Figure 3A:
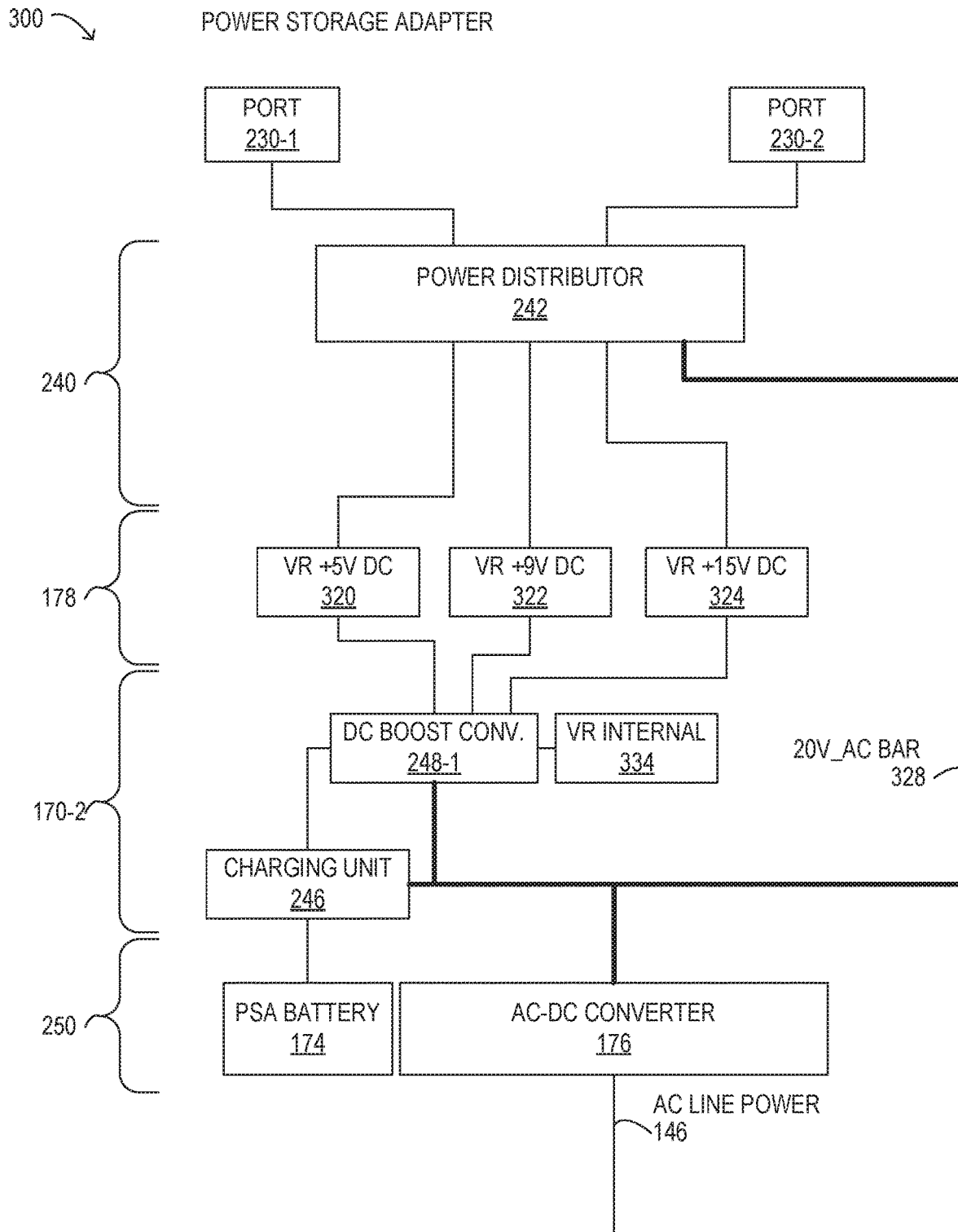
FIGS. 3A and 3B are a block diagrams of selected elements of embodiments of a power storage adapter.

Referring now to FIG. 3A, a power storage adapter 300 is illustrated in particular detail. Specifically, power storage adapter 300 is an embodiment of power storage adapter 172 shown in FIGS. 1 and 2 with particular elements and components illustrated. It is noted that FIG. 3A is not drawn to scale but is a schematic illustration. In various embodiments, power storage adapter 300 may be implemented using fewer or additional components than illustrated in FIG. 3A.

In FIG. 3A, AC-DC converter 176 receives AC line power 146 as a source of electrical energy. Among other functionality, AC-DC converter 176 may generate a regulated 20V output to a 20V_AC bar 328 that distributes the 20V to various different components included in power storage adapter 300. For example, AC-DC converter 176 may directly output regulated 20V via 20V_AC bar 328 to power distributor 242, which is shown included in VPB controller 240. As shown, power distributor 242 may be enabled to distribute electrical power to ports 230-1 and 230-2, which may be USB ports in particular embodiments. For example, power distributor 242 may include a cross connect switch, such as a matrix switch, among other elements, to distribute various power inputs to ports 230. In particular, power distributor 242 may implement OR functionality to provide a particular voltage output to one of ports 230-1 and 230-2, but not both ports 230. Because power delivery at ports 230 to a portable information handling system or another power consuming device may be governed by USB power delivery specifications, power storage adapter 300 may be implemented to limit supply of a particular voltage to a single one of ports 230 by refusing a request for a second supply of electrical power at the same voltage as is already being supplied to one of ports 230.

Although the OR functionality with respect to ports 230 may limit the possible power supply configurations of power storage adapter 300, in practice, because the power delivery capacity of power storage adapter 300 is finite, typical usage scenarios with portable information handling systems and other power consuming devices may rarely be constrained in actual practice for users of power storage adapter 300. For example, port 230-1 may be a USB Type-C port used to power a primary portable information handling system by a user, such as a Dell laptop computer or another brand of laptop computer. Then, the user may connect another power consuming device, such as a secondary portable information handling system that is a cellular telephone associated with the user, to port 230-2, which may be a USB Type-C or a USB Type-A port. Because the secondary portable information handling system may consume less electrical power than the primary information handling system, the secondary portable information handling system may negotiate and establish a USB power delivery contract for a lower power, and hence, at a lower voltage (see also Table 1) than the primary portable information handling system. Furthermore, because the primary portable information handling system may easily consume more than half of the electrical power supplied by power storage adapter 300, power storage adapter 300 may be constrained from simultaneously supplying two primary portable information handling systems because of the rated electrical power capability of power storage adapter 300.

As a result of the OR functionality with respect to ports 230 and 20V_AC bar 328, power storage adapter 300 may be implemented with fewer voltage regulators than other typical implementations or designs, such as other conventional USB Type-C power sources. As shown in FIG. 3A, power storage adapter 300 may implement three voltage regulators in DC-DC converter 178, corresponding to supply voltages specified by USB Type-C. Specifically, power storage adapter 300 may include a voltage regulator (VR)+5V DC 320, a VR+9V DC 322, and a VR+15V DC 324, each of which may be used for regulating an output voltage at either port 230-1 or 230-2. In conventional designs, each output port 230 is typically equipped with a set of VRs that are dedicated to the port. Because VRs have a power inefficiency of about 8-10%, the reduction in the number of VRs used in power storage adapter 300 may be a significant contribution to high efficiency operation. Accordingly, a DC boost converter 248-1 (included with PSA BMU 170-2) may provide a 5V output to VR+5V DC 320, a 9V output to VR+9V DC 322, and a 15V output to VR+15V DC 324. Power distributor 242 may then selectively route the electrical power to individual ones of output ports 230. It is noted that ports 230 may be different types of ports, such as different types of USB ports. For example, port 230-1 may be a USB Type-C port, while port 230-2 may be a USB Type-A port.

Also in FIG. 3A, charging unit 246 may charge PSA battery 174 according to a charging curve (see also FIG. 4) and may receive 20V_AC bar 328 as a voltage source of power. As shown in further detail with respect to FIG. 4, charging unit 246 may be enabled to use a boost charging voltage that incrementally boosts a charging voltage of PSA battery 174. The use of the boost charging voltage by charging unit 246 may occur, in certain embodiments, when both ports 230 are disconnected and are not used for supplying power from power storage adapter 300. Additionally, charging unit 246 may supply electrical power from PSA battery 174 to DC boost converter 248-1, for example, when AC line power 146 is not connected and PSA battery 174 has a sufficient state of charge to supply electrical power. Also shown in a VR internal 334, which may be used by DC boost converter 248-1 for internal purposes.

Figure 3B:
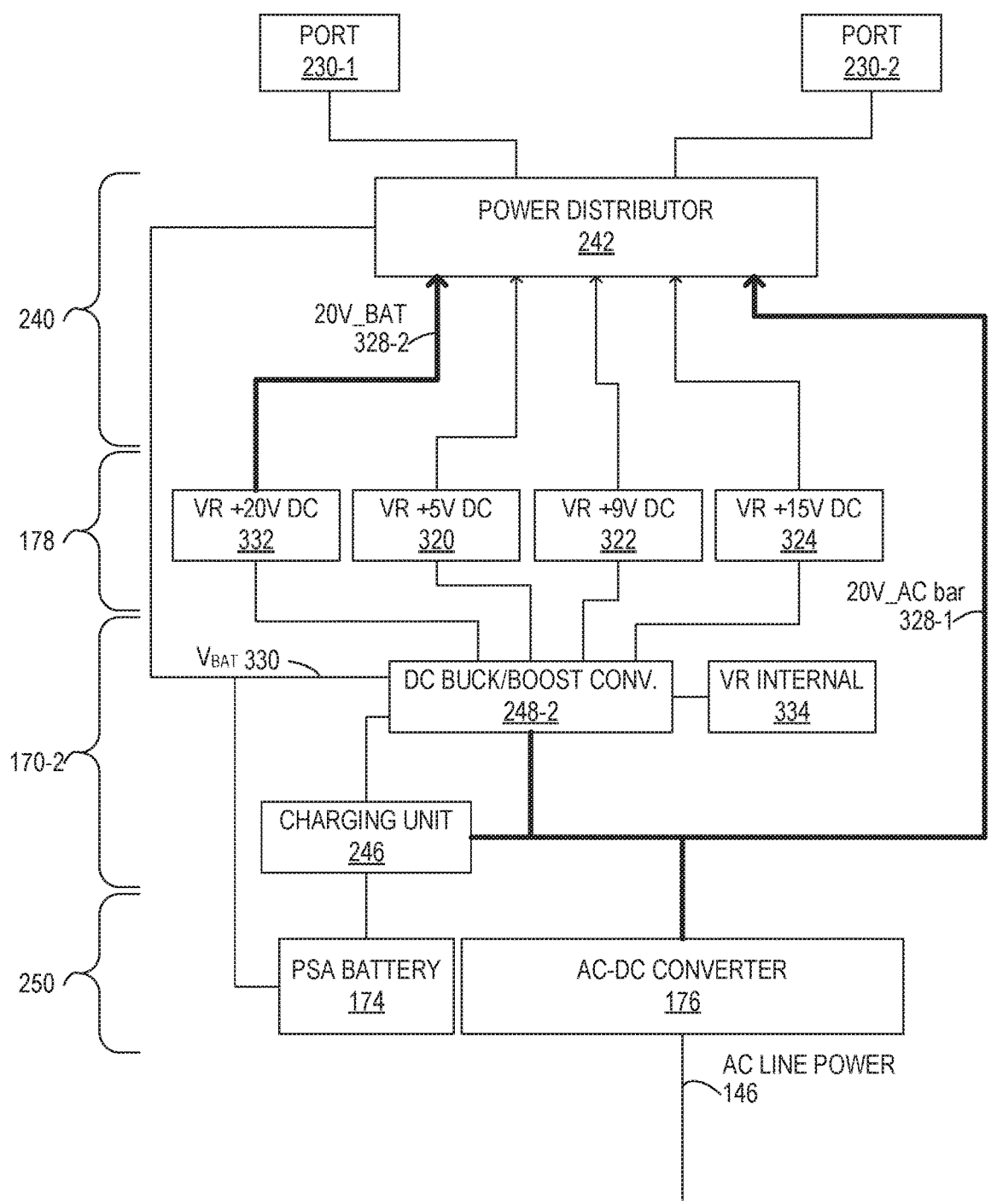

Referring now to FIG. 3B, a power storage adapter 301 is illustrated in particular detail. Specifically, power storage adapter 301 is an embodiment of power storage adapter 172 shown in FIGS. 1 and 2 with particular elements and components illustrated. It is noted that FIG. 3B is not drawn to scale but is a schematic illustration. In various embodiments, power storage adapter 301 may be implemented using fewer or additional components than illustrated in FIG. 3B.

In FIG. 3B, power storage adapter 301 is similar to power storage adapter 300 described above with respect to FIG. 3A and may operate as described above for power storage adapter 300. In FIG. 3B, power storage adapter 301 additionally shows a battery voltage VBAT 330 that is output directly from PSA battery 174 to a DC buck/boost converter 248-2.

When AC line power 146 is not connected, VBAT may be used from DC buck/boost converter 248-2 to generate a 20V_BAT voltage 328-2 using a VR+20V DC 332 for distribution by power distributor 242.

When AC line power 146 is connected, power distributor 242 may receive both 20V_AC bar 328-1 and 20-V_BAT voltage 328-2 as a secondary source of boost electrical power, and may combine both sources of 20V electrical power to supply a boosted amount of electrical power. The boosted amount of electrical power supplied in this manner may exceed a nominal power rating for AC-DC converter 176, for example. While 20V_AC bar 328-1 supplies electrical power that is sourced from AC power line 146, the boost electrical power (20V_BAT 328-2) may be added to 20V_AC bar 328-1 as long as PSA battery 174 has sufficient SOC and AC line power 146 is connected and providing electrical power.

Additionally, power distributor 242 may also directly receive VBAT 330 from PSA battery 174, for example, when a different supply voltage than shown in Table 1 are supplied to one or more of PSA ports 230. For example, when portable information handling system 100-1 connected to PSA port 230-1 is enabled to receive VBAT 330 as a supply voltage, PSA adapter 301 may directly supply VBAT 330 as a source of electrical power. In this manner, electrical power supplied by PSA battery 174 may be output at a voltage that is more efficient for operation of PSA battery 174 (as compared to the fixed voltages in Table 1), which may be desirable for power efficient operation of power storage adapter 301, and of PSA battery 174. In particular, the direct supply of VBAT 330 at one of PSA ports 230 may occur when AC line power 146 is not connected and PSA battery 174 is the source of electrical power supplied by power storage adapter 301.

Power storage adapter 301 may be implemented to limit supply of a particular voltage to a single one of ports 230, previously described. Supply of the particular voltage may also be limited to a single one or port due to a number of voltage regulators for regulating the particular voltage, a current limitation of a voltage regulator, among other limitations of power storage adapter 301. Examples of voltages and voltage regulators that may be limited to a single one of ports 230 or may be shared by both ports 230 are given in Table 3 below.

TABLE 3

Voltages and voltage regulators that may be limited to a single one of ports 230 or may be shared by both ports 230.

| Voltage and Voltage Regulator | Limited to Single Port | May be Shared by Both Ports |
|---|---|---|
| 5 V, VR +5 V DC 320 | | Yes/Shared |
| 9 V, VR +9 V DC 322 | Yes/Limited | No |
| 15 V, VR +15 V DC 324 | Yes/Limited | No |
| 20 V, VR +20 V DC 332 | Yes/Limited | No |

As shown in Table 3, the voltage of 5V and the voltage regulator VR+5V DC 320 may be shared by both ports 230-1 and 230-1, depending on the electrical power to be supplied, such as, for example, 2.5 W electrical power. The 9V, 15V, and 20V voltages and associated regulators are limited to a single one of ports 230-1 and 230-2.

Figure 4:
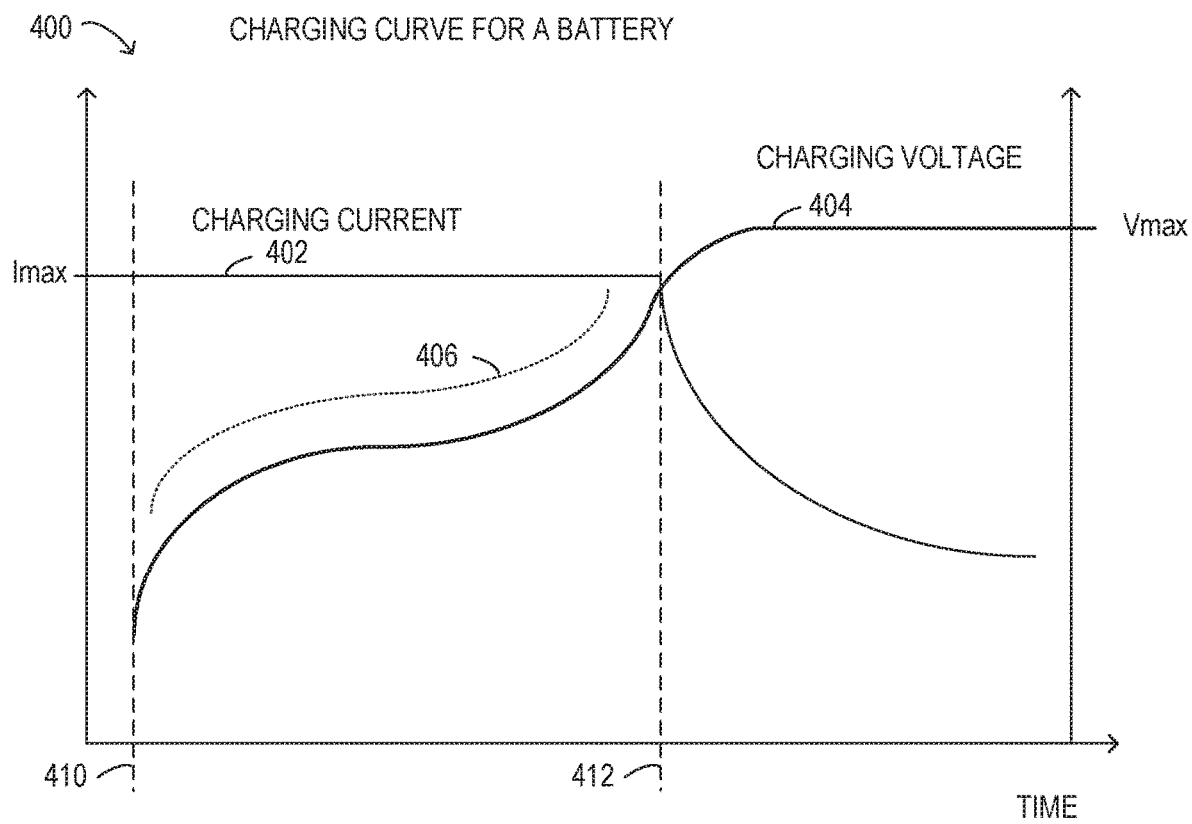
FIG. 4 is a plot showing selected elements of a charging curve for an information handling system battery.

FIG. 4 illustrates a charging curve 400 for a battery, such as internal battery 171 or PSA battery 174. Charging curve 400 is schematically illustrated and is not drawn to scale or perspective. Charging curve 400 may be implemented by BMU 170, for example, using charging unit 246 (see FIG. 2). Charging curve 400 depicts how a charging current 402 and a charging voltage 404 respond over time to various conditions. Specifically, at time 410, it is assumed that the battery is discharged and is charged by supplying charging current 402 that is constant, given by Imax, which is a maximum charging current. In the constant current charging regime between time 410 and time 412, charging voltage 404 may increase from a low value to a higher value as the SOC for the battery increases. At time 412, charging voltage 404 may approach a maximum value, given by Vmax, and may remain constant after time 412. At about time 412, meanwhile, charging current 402 may begin to decrease as the SOC for the battery increases at a lower rate. After time 412, in a constant voltage charging regime, charging current 402 may taper off until at some point, the SOC approaches a maximum value, and no further charging occurs.

Also shown in FIG. 4 is a boost charging voltage 406. Specifically, charging unit 246 may apply boost charging voltage 406 to improve a charging efficiency, for example, by reducing an amount of electrical power consumed during charging, as compared with supplying constant charging voltage Vmax.

Figure 5A:
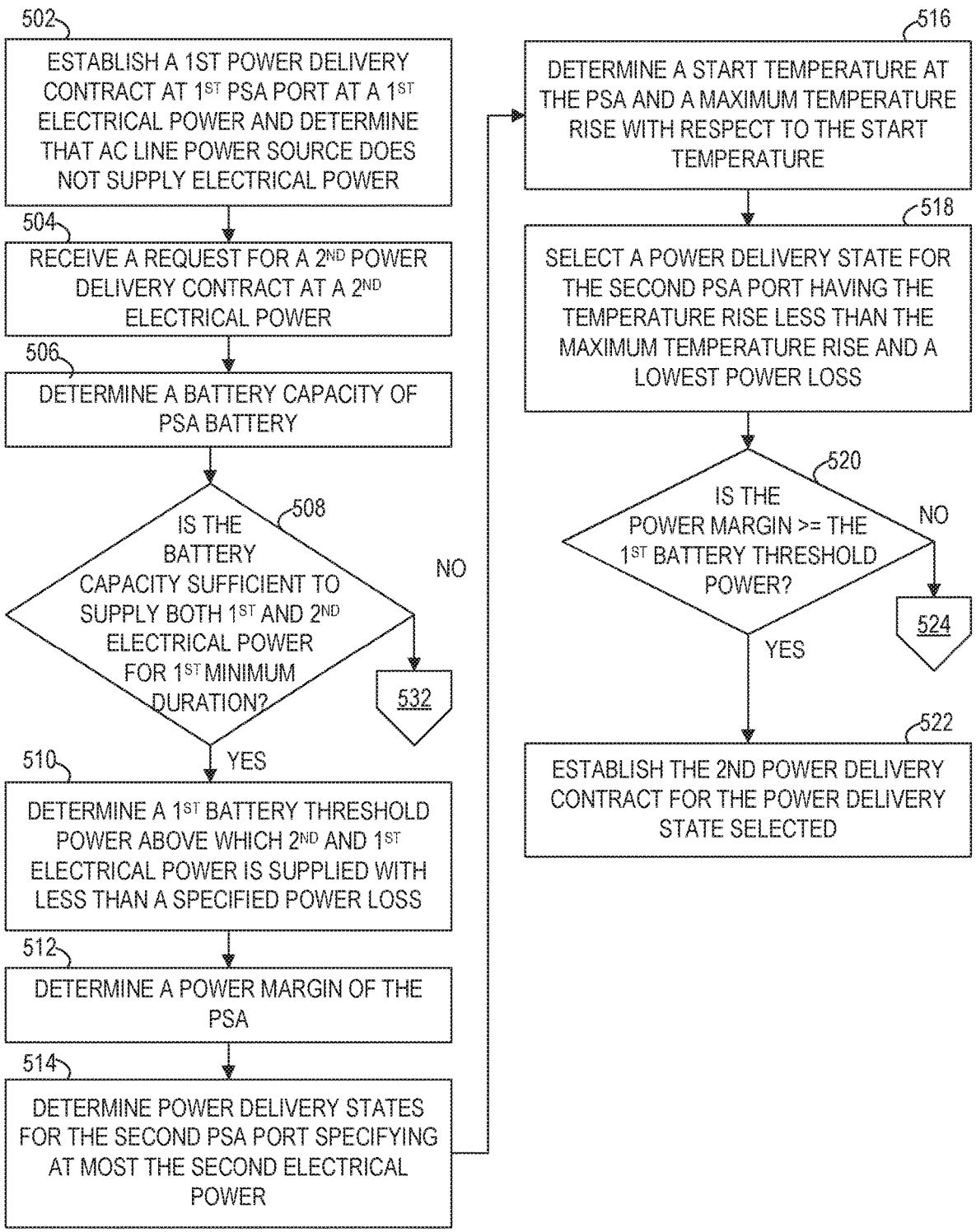
FIGS. 5A and 5B is a flow chart of selected elements of a method for efficient supply of power of multiple portable information handling systems.
Figure 5B:
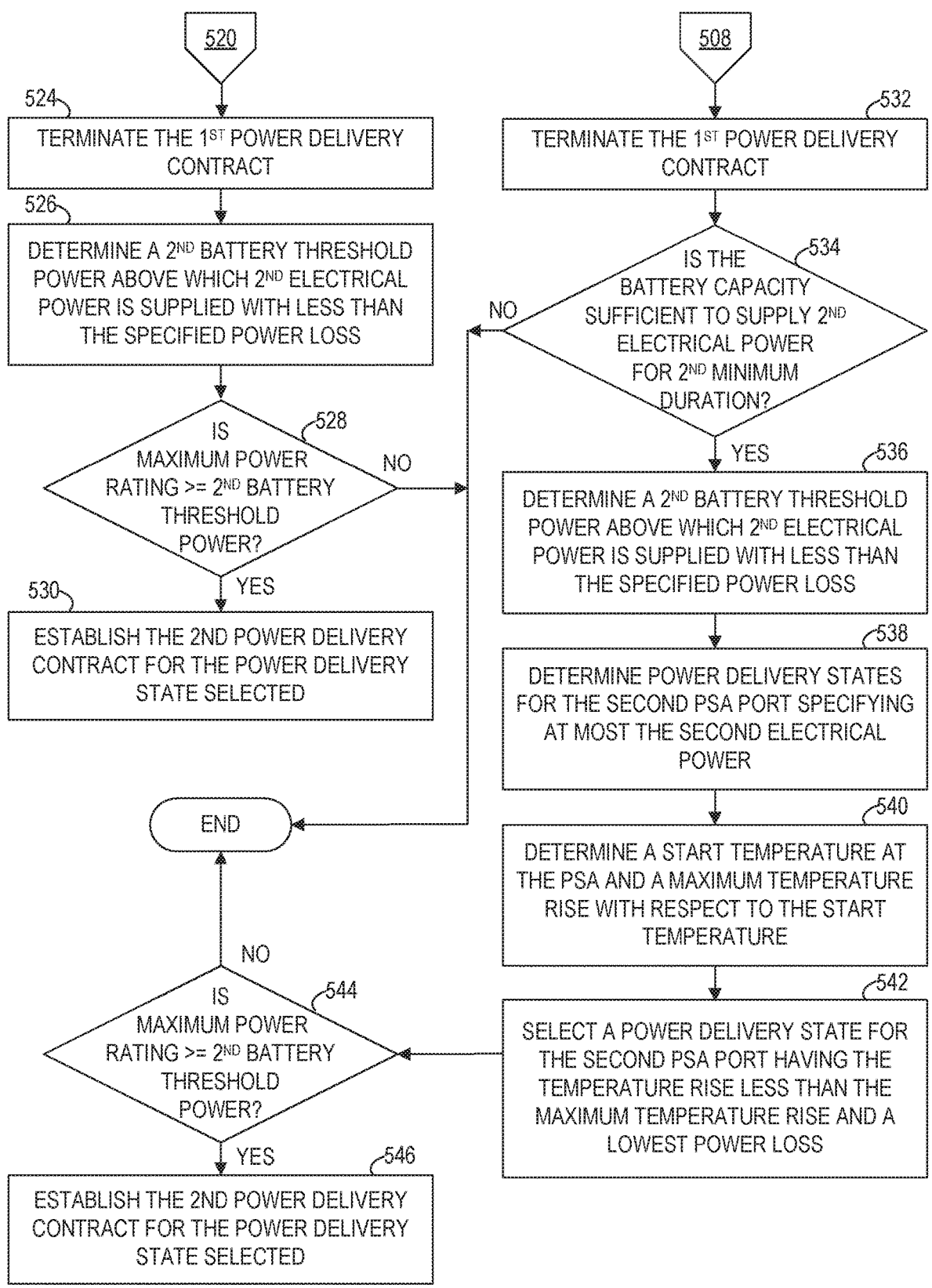

Referring now to FIGS. 5A and 5B, a flow chart of selected elements of an embodiment of method 500 for efficient supply of power of multiple portable information handling systems, as described herein, is depicted in flowchart form. Method 500 may be performed using power storage adapter 172 and, in particular, by PSA controller 221. It is noted that certain operations described in method 500 may be optional or may be rearranged in different embodiments.

Method 500 may begin at, step 502, by establishing a first power delivery contract to supply a first electrical power from a PSA battery of a PSA to a first portable information handling system coupled to the power storage adapter at a first PSA port of the PSA. At step 504, when an AC line power source does not supply electrical power to the PSA battery, receiving a request for a second power delivery contract from a second portable information handling system coupled to the PSA at a second PSA port of the PSA, the second power delivery contract to supply a second electrical power to the second portable information handling system. At step 506, responsive to receiving the request, determining a battery capacity of the PSA battery. At step 508, a decision whether the battery capacity is sufficient to supply a sum of the first electrical power and the second electrical power for a first minimum duration. When the result of step 508 is YES, method 500 may proceed to step 510. When the result of step 508 is NO, method 500 may proceed to step 532. At step 510, determining a first battery threshold power above which the second electrical power supplied at the second PSA port, in addition to the first electrical power supplied at the first PSA port, is supplied with less than a specified power loss. At step 512, determining a power margin of the PSA as a difference between a maximum power rating of the PSA and the first electrical power. At step 514, determining power delivery states for the second PSA port specifying at most the second electrical power. A power delivery state may specify a voltage, a power, a power loss, and a temperature rise. At step 516, determining a start temperature at the PSA and a maximum temperature rise with respect to the start temperature. At step 518, selecting a power delivery state for the second PSA port having the temperature rise less than the maximum temperature rise and a lowest power loss. At step 520, a decision whether the power margin is greater than or equal to the first battery threshold power. When the result of step 520 is YES, method 500 may proceed to step 522. When the result of step 520 is NO, method 500 may proceed to step 524. At step 522, establishing the second power delivery contract for the power delivery state selected. At step 524, discontinuing supplying the first electrical power at the first PSA port. At step 526, responsive to discontinuing supplying the first electrical power, determining a second battery threshold power above which the second electrical power supplied at the second PSA port is supplied with less than the specified power loss. At step 528, a decision whether the maximum power rating is greater than or equal to the second battery threshold power. When the result of step 528 is YES, method 500 may proceed to step 530. When the result of step 530 is NO, method 500 may end. At step 530, establishing the second power delivery contract for the power delivery state selected. At step 532, discontinuing supplying the first electrical power at the first PSA port. At step 534, a decision whether the battery capacity is sufficient to supply the second electrical power for a second minimum duration. When the result of step 534 is YES, method 500 may proceed to step 536. When the result of step 534 is NO, method 500 may end. At step 536, determining a second battery threshold power above which the second electrical power supplied at the second PSA port is supplied with less than the specified power loss. At step 538, determining power delivery states for the second PSA port specifying at most the second electrical power. At step 540, determining a start temperature at the PSA and a maximum temperature rise with respect to the start temperature. At step 542, selecting a power delivery state for the second PSA port having the temperature rise less than the maximum temperature rise and a lowest power loss. At step 544, a decision whether the maximum power rating is greater than or equal to the second battery threshold power. When the result of step 544 is YES, method 500 may proceed to step 546. When the result of step 544 is NO, method 500 may end. At step 546, establishing the second power delivery contract for the power delivery state selected.

As disclosed herein, a power storage adapter may use a method for efficient supply of power of multiple portable information handling systems. In particular, when electrical power is delivered from a battery to at least one of the portable information handling systems, the power storage adapter may deliver electrical power from the battery to another portable information handling system when the battery has sufficient battery capacity such that the power is supplied efficiently.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A power storage adapter (PSA), comprising:
a first PSA port and a second PSA port;
a PSA battery; and
a PSA controller having access to memory media storing instructions executable by the PSA controller to:
establish a first power delivery contract to supply a first electrical power from the PSA to a first portable information handling system coupled to the power storage adapter at the first PSA port; and
when an AC line power source does not supply electrical power to the PSA battery:
receive a request for a second power delivery contract from a second portable information handling system coupled to the power storage adapter at the second PSA port, the second power delivery contract to supply a second electrical power to the second portable information handling system;
responsive to receiving the request, determine a battery capacity of the PSA battery; and
when the battery capacity is sufficient to supply a sum of the first electrical power and the second electrical power for a first minimum duration, perform a first power state analysis further comprising:
determine a first battery threshold power above which the second electrical power supplied at the second PSA port, in addition to the first electrical power supplied at the first PSA port, is supplied with less than a specified power loss;
determine a power margin of the PSA as a difference between a maximum power rating of the PSA and the first electrical power; and
when the power margin is greater than or equal to the first battery threshold power, establish the second power delivery contract.

2. The power storage adapter of claim 1, wherein the first power state analysis further comprises instructions to:
determine power delivery states for the second PSA port specifying no more than the second electrical power, wherein a power delivery state further specifies a voltage, a power loss, and a temperature rise;
determine a start temperature at the PSA and a maximum temperature rise with respect to the start temperature;
select a power delivery state for the second PSA port having the temperature rise less than the maximum temperature rise and a lowest power loss; and
establish the second power delivery contract for the power delivery state selected.

3. The power storage adapter of claim 1, further comprising instructions to,
when the power margin is less than the first battery threshold power:
discontinue supplying the first electrical power at the first PSA port;
responsive to discontinuing supplying the first electrical power, determine a second battery threshold power above which the second electrical power supplied at the second PSA port is supplied with less than the specified power loss; and
when the maximum power rating is greater than or equal to the second battery threshold power, establish the second power delivery contract.

4. The power storage adapter of claim 1, further comprising instructions to:
when the battery capacity is not sufficient to supply the sum of the first electrical power and the second electrical power for the first minimum duration, discontinue supplying the first electrical power at the first PSA port; and
responsive to discontinuing supplying the first electrical power, when the battery capacity is sufficient to supply the second electrical power for a second minimum duration, perform a second power state analysis further comprising:
determine a second battery threshold power above which the second electrical power supplied at the second PSA port is supplied with less than the specified power loss; and
when the maximum power rating is greater than or equal to the second battery threshold power, establish the second power delivery contract.

5. The power storage adapter of claim 4, wherein the second power state analysis further comprises instructions to:
determine power delivery states for the second PSA port specifying no more than the second electrical power, wherein a power delivery state further specifies a voltage, a power loss, and a temperature rise;
determine a start temperature at the PSA and a maximum temperature rise with respect to the start temperature;
select a power delivery state for the second PSA port having the temperature rise less than the maximum temperature rise and a lowest power loss; and
establish the second power delivery contract for the power delivery state selected.

6. The power storage adapter of claim 1, further comprising instructions to:
prior to establishing the first power delivery contract, establish a reserved power delivery contract to supply a reserved electrical power from the power storage adapter at the second PSA port, wherein the reserved electrical power enables the power storage adapter to supply a minimum electrical power at the first PSA port and at the second PSA port, and wherein the minimum electrical power is selected to enable operation of a PSA port.

7. The power storage adapter of claim 6, wherein the instructions to establish the second power delivery contract further comprise instructions to:
discontinue supplying the reserved electrical power at the second PSA port.

8. The power storage adapter of claim 1, wherein the first electrical power is supplied at a first DC voltage and the second electrical power is supplied at a second DC voltage.

9. The power storage adapter of claim 8, wherein the specified power loss results from at least one of: a power loss associated with the first DC voltage, and a power loss associated with the second DC voltage, and wherein the first DC voltage and the second DC voltage are different voltages, and wherein the first PSA port and the second PSA port are USB Type-C ports.

10. The power storage adapter of claim 1, wherein the first minimum duration and a second minimum duration are at least 5 watt-hours, a maximum temperature rise is no more than 1.2° F. rise for 15 minutes, and the specified power loss is based on at least power delivery states for the second PSA port specifying at most the second electrical power, wherein a power delivery state specifies a voltage, a power, a power loss, and a temperature rise, and the specified power loss and the temperature rise are based on characterization at the specified voltage and power.

11. A method, comprising:
establishing a first power delivery contract to supply a first electrical power from a power storage adapter (PSA) to a first portable information handling system coupled to the power storage adapter at a first PSA port of the PSA; and
when an AC line power source does not supply electrical power to the PSA battery:
receiving a request for a second power delivery contract from a second portable information handling system coupled to the PSA at a second PSA port of the PSA, the second power delivery contract to supply a second electrical power to the second portable information handling system;
responsive to receiving the request, determining a battery capacity of the PSA battery; and
when the battery capacity is sufficient to supply a sum of the first electrical power and the second electrical power for a first minimum duration, performing a first power state analysis further comprising:
determining a first battery threshold power above which the second electrical power supplied at the second PSA port, in addition to the first electrical power supplied at the first PSA port, is supplied with less than a specified power loss;
determining a power margin of the PSA as a difference between a maximum power rating of the PSA and the first electrical power; and
when the power margin is greater than or equal to the first battery threshold power, establishing the second power delivery contract.

12. The method of claim 11, wherein the first power state analysis further comprises:
determining power delivery states for the second PSA port specifying no more than the second electrical power, wherein a power delivery state further specifies a voltage, a power loss, and a temperature rise;
determining a start temperature at the PSA and a maximum temperature rise with respect to the start temperature;
selecting a power delivery state for the second PSA port having the temperature rise less than the maximum temperature rise and a lowest power loss; and
establishing the second power delivery contract for the power delivery state selected.

13. The method of claim 11, further comprising, when the power margin is less than the first battery threshold power:
discontinuing supplying the first electrical power at the first PSA port;
responsive to discontinuing supplying the first electrical power, determining a second battery threshold power above which the second electrical power supplied at the second PSA port is supplied with less than the specified power loss; and
when the maximum power rating is greater than or equal to the second battery threshold power, establishing the second power delivery contract.

14. The method of claim 11, further comprising:
when the battery capacity is not sufficient to supply the sum of the first electrical power and the second electrical power for the first minimum duration, discontinuing supplying the first electrical power at the first PSA port; and
responsive to discontinuing supplying the first electrical power, when the battery capacity is sufficient to supply the second electrical power for a second minimum duration, performing a second power state analysis further comprising:
determining a second battery threshold power above which the second electrical power supplied at the second PSA port is supplied with less than the specified power loss; and
when the maximum power rating is greater than or equal to the second battery threshold power, establishing the second power delivery contract.

15. The method of claim 14, wherein the second power state analysis further comprising:
determining power delivery states for the second PSA port specifying no more than the second electrical power, wherein a power delivery state further specifies a voltage, a power loss, and a temperature rise;
determining a start temperature at the PSA and a maximum temperature rise with respect to the start temperature;
selecting a power delivery state for the second PSA port having the temperature rise less than the maximum temperature rise and a lowest power loss; and
establishing the second power delivery contract for the power delivery state selected.

16. The method of claim 11, further comprising:
prior to establishing the first power delivery contract, establishing a reserved power delivery contract to supply a reserved electrical power from the power storage adapter at the second PSA port, wherein the reserved electrical power enables the power storage adapter to supply a minimum electrical power at the first PSA port and at the second PSA port, and wherein the minimum electrical power is selected to enable operation of a PSA port.

17. The method of claim 16, wherein establishing the second power delivery contract further comprises:
discontinuing supplying the reserved electrical power at the second PSA port.

18. The method of claim 11, wherein the first electrical power is supplied at a first DC voltage and the second electrical power is supplied at a second DC voltage.

19. The method of claim 18, wherein the specified power loss results from at least one of: a power loss associated with the first DC voltage, and a power loss associated with the second DC voltage, and wherein the first DC voltage and the second DC voltage are different voltages, and wherein the first PSA port and the second PSA port are USB Type-C ports.

20. The method of claim 11, wherein the first minimum duration and a second minimum duration are at least 5 watt-hours, a maximum temperature rise is no more than 1.2° F. rise for 15 minutes, and the specified power loss is based on at least power delivery states for the second PSA port specifying at most the second electrical power, wherein a power delivery state specifies a voltage, a power, a power loss, and a temperature rise, and the specified power loss and the temperature rise are based on characterization at the specified voltage and power.

* * * * *